May 15, 1928.
J. A. KENNEDY
1,669,617
CARTON FOR POTS OF PLANTS, FLOWERS, AND THE LIKE
Filed June 30. 1924       2 Sheets-Sheet 1
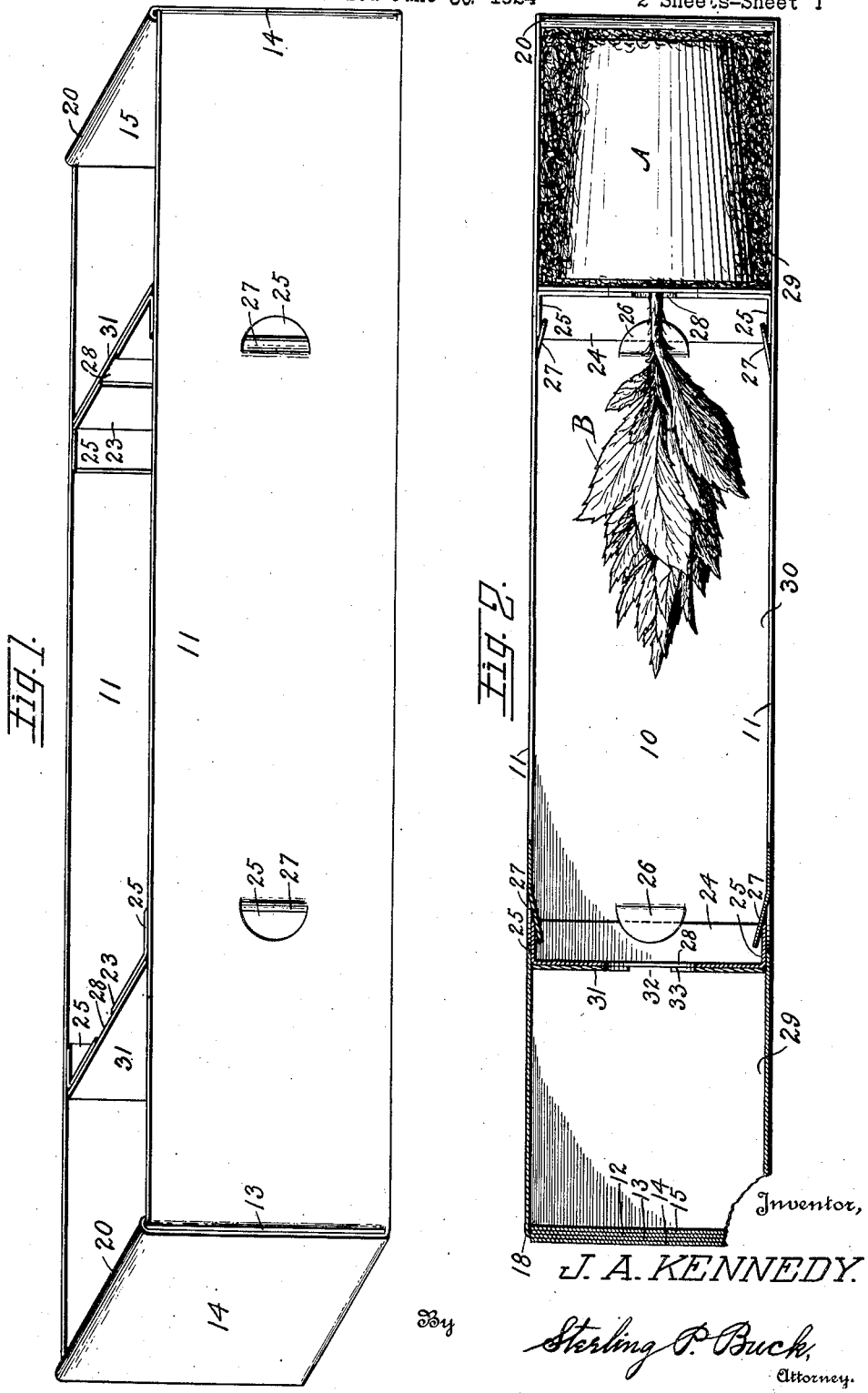

May 15, 1928.
J. A. KENNEDY
1,669,617
CARTON FOR POTS OF PLANTS, FLOWERS, AND THE LIKE
Filed June 30, 1924    2 Sheets-Sheet 2
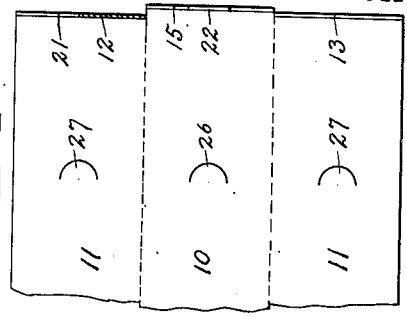
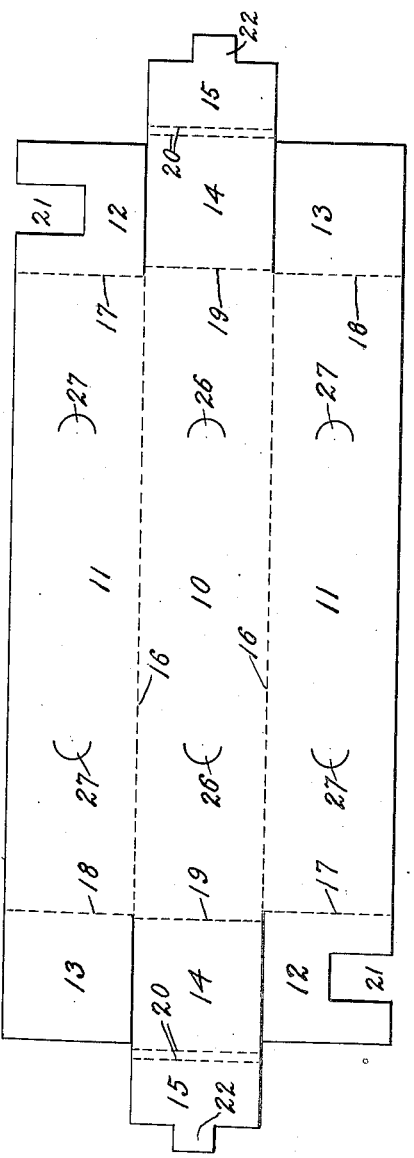
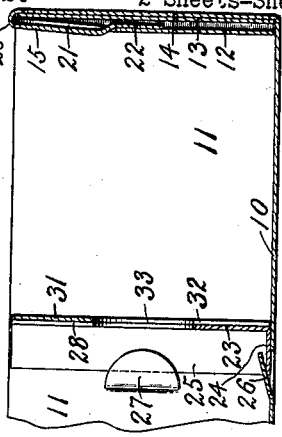
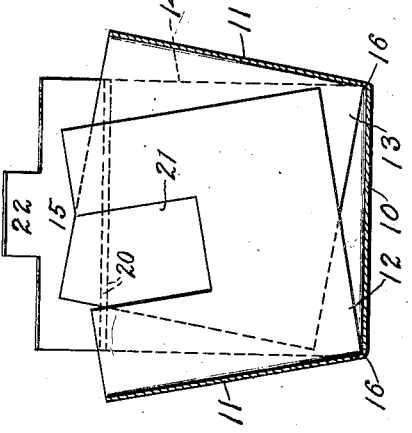
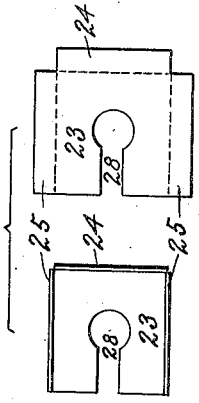
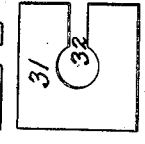
Inventor,
J. A. KENNEDY.
By Sterling P. Buck,
Attorney.

Patented May 15, 1928.

1,669,617

UNITED STATES PATENT OFFICE.

JOHN A. KENNEDY, OF LITTLE SILVER BOROUGH, NEW JERSEY.

CARTON FOR POTS OF PLANTS, FLOWERS, AND THE LIKE.

Application filed June 30, 1924. Serial No. 723,178.

This invention relates to box-blanks, also to the form of collapsible box made from such blanks, and specifically, to an improved carton for pots of plants, flowers or the like.

One object of this invention is to provide a box or carton of this character that is exceedingly simple in construction and convenient in the operation of securing the flower-pot or pots of flowers therein, while minimizing the danger of barking, abrading or bruising the stalks or stems of the flowers or plants being placed and secured in the box. Another object is to provide a box of this character that is exceedingly useful in receiving and carrying plants or flowers that have been taken from the flower-pots or outer earthen bed, together with a ball or mass of earth around its roots; and which box will withstand the moisture which will ordinarily ooze from the earth around the plant-roots, in consequence of the plural thicknesses of card-board almost surrounding the said mass of earth. Another object is to provide a box of this character with an improved form of recessed partition and an improved form of securing means for the partition; also an improved supplemental partition in a novel relation to the main partition.

Other objects and important features are pointed out or implied in the following details of description, in connection with the accompanying drawings in which:—

Fig. 1 is a perspective view of a box constructed in accordance with this invention: Fig. 2 is a top plan view of the box having a potted plant therein, the end opposite to the one having the plant therein being in horizontal section, one corner being broken off: Fig. 3 is a plan view of the main blank from which the bottom and walls are formed: Fig. 4 is a detail view showing one end of the main blank having its end-forming sections turned up: Fig. 5 is an enlarged detail view showing the end-forming parts of one end turned up and interlapped as if being moved from the position in Fig. 4 to the position in Fig. 6: Fig. 6 is a longitudinal vertical sectional view through the center of one end of the box: Fig. 7 is a view of the main partition (at the left) and of the blank from which the main partition is formed (at the right): Fig. 8 is a view of the supplemental partition. In these views, I have omitted the box-cover, it being sufficient to state that the cover may be of any appropriate kind, for instance, the same as the box shown in Fig. 1, except slightly larger and omitting the partitions and partition keepers. While I have shown two partitions and two supplemental partitions, I have mentioned them in the singular, because the description of one suffices for both, and in some instances I may eliminate one of them, especially where the plant-stem is unusually long, or where the flower-pot or mass of earth around the roots is excessively large or heavy.

Referring to the drawings by reference characters each of which represents a part which is the same in all the views; and referring to the flower-pot and plant by the reference characters A and B, respectively: The blank and box consist of a bottom-part 10, side wall-parts 11, and end wall-parts 12, 13, 14 and 15, all of which are integrally formed of a single blank of pasteboard or other suitable sheet material that is easily formed with weakened lines about which the several wall parts are bent when forming the box from the blank; for instance, the lines 16 are those at which the side walls of the box are bent up at the longitudinal edges of the bottom 10, the parts 12 are bent up at the lines 17, the parts 13 are bent up at the lines 18, the parts 14 are bent up at 19, and the parts 15 are bent inward and downward at the lines 20. Each part 12 is formed with a recess 21 which receives a tongue 22 of the adjacent part 15 in the manner more clearly shown in Fig. 6 where it is seen that the tongue 22, after passing through the recess 21, extends into the space between the parts 12 and 13; so, the greater the weight or pressure against the parts 12 and 15, the greater the grip exerted on the tongue 22; so this provides an exceedingly strong boxend, especially in view of the three thicknesses formed by the parts 12, 13 and 14, and bound in their interlapping relation by the part at 20 being bent over the upper edges of these interlapping parts.

A very important and exceedingly simple feature of this invention, is the duplex partition (one or more) and the securing means therefor. The main partition 23 is formed of the blank shown in the right side of Fig. 7, and its flanges 24 and 25 are turned at right angles to the main body of the blank. Ears 26 and 27 are struck up from the bottom part and side wall-parts, and these ears each stand at an angle to the adjacent surface from which it was struck up. When securing the partition (or either of them) in place, it is only necessary to press its flanges under or behind the ears 26 and 27. Each partition 23 has therein a recess 28 which opens through its upper edge, this recess being wider than a mere slit, in fact, it has sufficent width to permit a comparatively thick plant stalk or stem to be passed into this recess without contact of the plant stem or stalk with the edges of the recess, as is shown in Fig. 2. Its lower end is preferably widened, so the plant stalk will not move into contact with the partition even if the moss or other fiber (packing shown in Fig. 2) is not sufficient to prevent some lateral movement of the pot or mass of earth containing the plant.

After the main partition is placed, as explained, the plant is then placed in the root-chamber 29, its stalk and foliage being in the chamber 30, which may be called the foliage chamber; and now the supplemental partition 31 is placed by turning its recess 32 to open downward, then passing this part 31 between the pot A (or mass of earth) and the partition 23. The recess 32 being wide, and the edges of the partition 31 being guided by the sides 11 of the box, this permits the placing of the supplemental partition without its coming into contact with the plant-stalk. Having thus placed the flower pot and partitions, the moss or other packing is packed around the pot or mass of earth, care being exercised to close the opening 33 which remains after each partition 23 and 31 has partly closed the respective recesses 28 and 32. Now, when the lid is put on the box, and the whole is wrapped or tied for transportation, the lid prevents the partition from rising, and the pot or mass of earth prevents the partition from backing out of engagement with the ears 26 and 27. However, when the lid is removed, and it is now desired to remove the plant and pot, this can be done by even a thoughtless or careless person without injury to the plant; for now, on raising the plant and pot, the flange 24 easily yields, in consequence of its flexible connection and tendency to resume its original position before the blank was bent, and the partition comes out of the box with the plant and pot, revealing the recesses 28 and 32 to the recipient of the plant, and such person now sees how the plant stem can be caused to pass freely from the recesses.

From the foregoing, it will be seen that this very simple, convenient and effective box or carton is also very safe as a shipping receptacle for plants having their roots imbedded in the soil or earth in which such plants are kept alive and growing.

It is not intended to limit this invention to the exact construction and arrangement here shown, nor to any number of partitions, but changes may be made, by me or my assigns or heirs, within the scope of the inventive ideas, as implied and claimed.

What I claim as my invention is:

1. The foldable box structure which includes an end wall-part and side wall-parts the latter provided with keepers at a distance from the said end-wall-part, and a flanged partition whose flanges are adapted to slidingly engage with the keepers for securing the partition in place but permitting it to be easily lifted out of place, said partition being provided with a central recess to receive plant stalks which extend therethrough while a mass of earth or other material surrounds the plant's roots within a part of the box between said end-wall-part and partition, substantially as shown.

2. The structure defined by claim 1, said box structure also including a bottom-part provided with a keeper, said partition being provided with a bottom flange to interlock with said bottom-part's keeper, said bottom flange being flexibly united with the partition, whereby said bottom flange easily yields to permit the raising of the partition out of its interlocked engagement, substantially as specified.

3. The combination of an oblong box having end-walls and side-walls, the latter having ears united therewith and having free ends extending towards one of said end-walls, and a partition having flanges movable into and out of interlocking engagement with said ears and adapted to be held in such interlocking engagement by a flower-pot between said partition and said one of the end-walls, said partition having an opening therethrough to receive the stalk of a flower or plant in the flower pot, substantially as shown.

In testimony whereof I affix my signature.

JOHN A. KENNEDY.